United States Patent

[11] 3,581,495

[72] Inventor Carl L. C. Kah, Jr.
  Palm Beach Gardens, Fla.
[21] Appl. No. 725,954
[22] Filed May 1, 1968
[45] Patented June 1, 1971
[73] Assignee United Aircraft Corporation
  East Hartford, Conn.

[54] SLOT TUBE SWIRLER INJECTOR
  18 Claims, 8 Drawing Figs.
[52] U.S. Cl. .................................................. 60/39.74
[51] Int. Cl. .................................................. F02g 1/00
[50] Field of Search .................................... 60/39.74,
  39.65; 239/416.4, 416.5, 424.5, 399, 403—406

[56] References Cited
UNITED STATES PATENTS
2,603,535 7/1952 Ipsen et al. .................. 239/404
2,701,164 2/1955 Purchas, Jr. et al. .......... 239/404

Primary Examiner—Samuel Feinberg
Attorney—Jack N. McCarthy

ABSTRACT: An injector assembly has a liquid propellant manifold body on which there are located a plurality of holes of approximately the same depth, first passageways are connected to said holes between the top and the bottom of said holes and second passageways are connected to the bottom of said holes. A slot tube swirler injector or element is inserted and fixed in place in each hole. Each of these swirler elements has two sets of openings for inducing a swirling action along its length, one set of said openings is adjacent the bottom of the element and opens into one of said second passageways and the sec second set of openings opens into one of said first passageways. An injector face plate for gaseous propellant distribution is fixedly spaced a predetermined distance from said manifold body. Said face plate has openings therein and said elements extend into said openings. The openings are spaced from said elements to permit a flow of gas therearound. A first manifold directs a primary liquid flow to said first passageways and a second manifold directs a secondary liquid flow to said second passageways. Control means are provided to give desired primary and secondary flows. A combustion chamber is fixed around the face plate of said injector head and terminates in a nozzle rearwardly thereof. Means are provided for directing a gas to the forward side of said injection means. An opening or openings are provided to permit the gas to be admitted between the manifold body and face plate. In one instance, a cylindrical passageway means is used and in another the injector head is formed having radial spraybars with the openings being located therebetween. In the event throttling is not desired, one set of slots can be used.

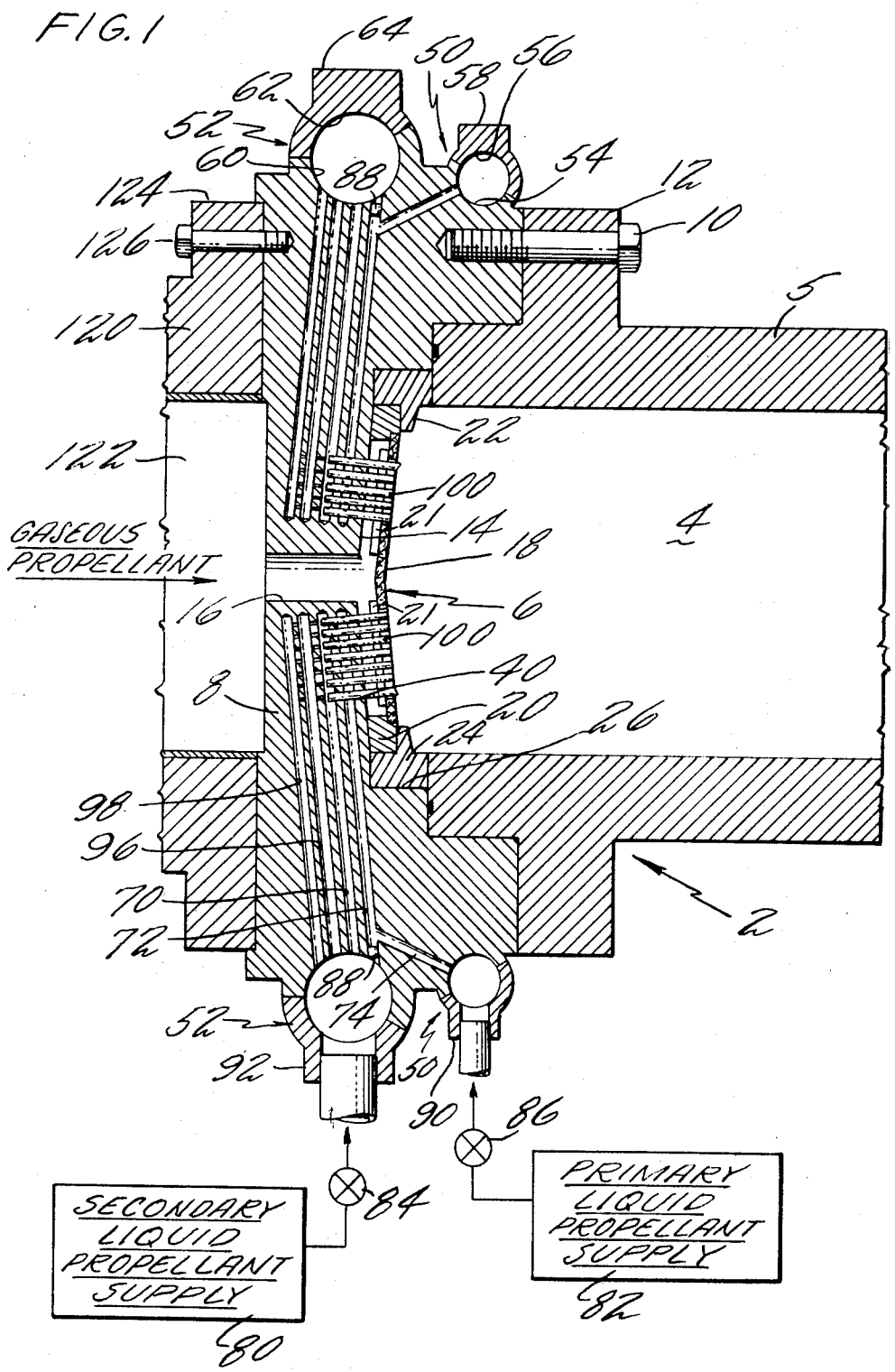

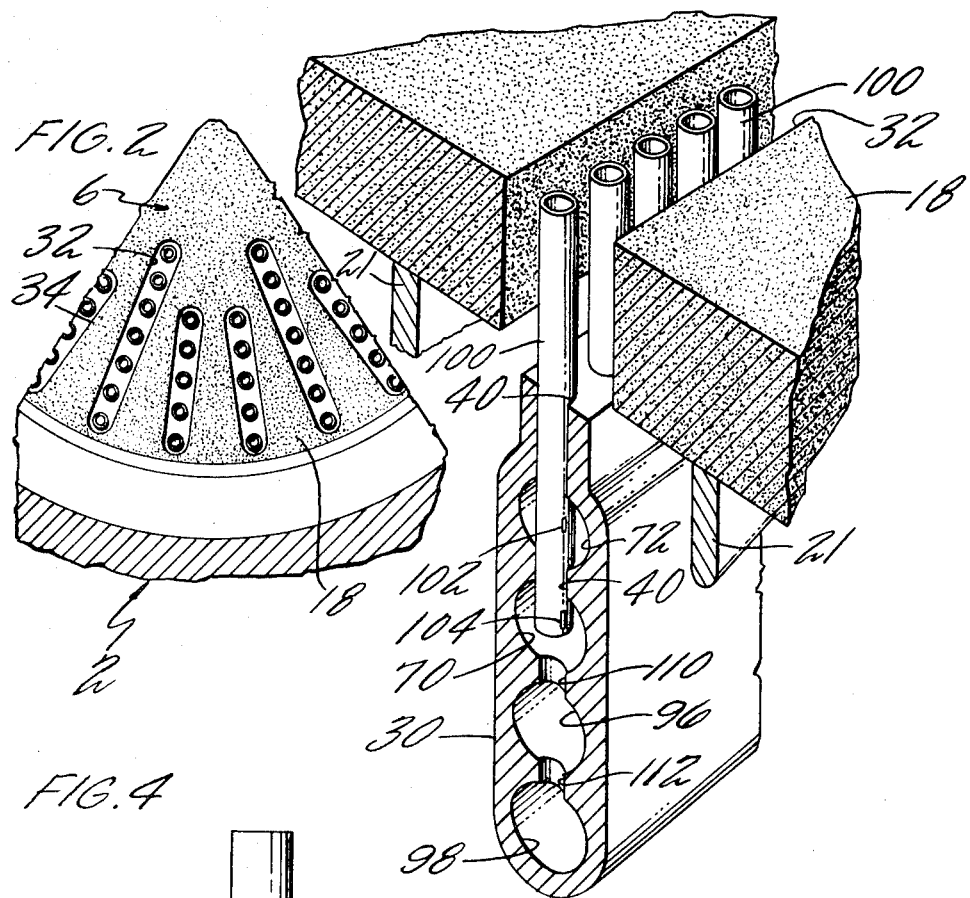
FIG. 3
FIG. 2
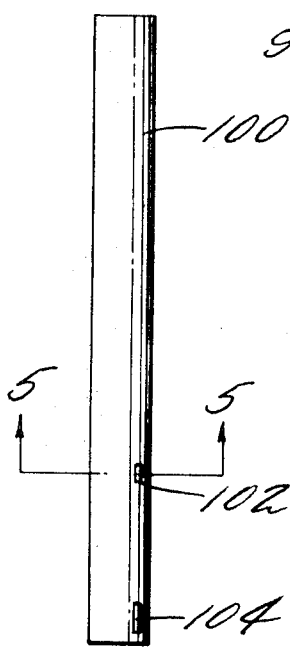
FIG. 4
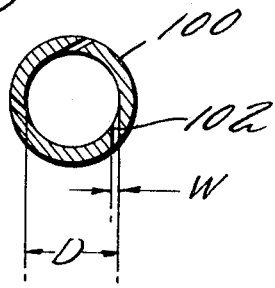
FIG. 5

SLOT TUBE SWIRLER INJECTOR

The invention herein described was made in the course of or under a contract with the Department of the Air Force.

BACKGROUND OF THE INVENTION

This invention relates to means for atomizing a liquid which is to be mixed with a gas and particularly to an injector assembly in which two propellants are to be used wherein one is a liquid and the other is a gas. In the prior art, various types of injectors and atomizing nozzles have been used. However, no such injector element is known which will provide the same degree of atomization for a given flow and area with the mechanical simplicity and durability such as the means described herein. While dual orifice type nozzles are known, the construction has been different and complicated as shown by U.S. Pat. No. 2,703,260. Other type injectors which have good atomization require that streams of liquid impinge on each other as shown by U.S. Pat. No. 3,122,885.

SUMMARY OF INVENTION

A primary object of the present invention is to provide for good atomization in an injection device over a throttling range by a momentum exchange between a primary flow and secondary flow achieved by a direct swirling action within a tube element.

In accordance with another aspect of the present invention, an element is provided which is without moving parts and is a member which is fixed to the injector.

In accordance with a further aspect of the present invention, an injection element comprises a tube of small constant diameter with tangential inlet slots. A second set of tangential openings of different area is provided at a different position along the elements length and separately manifolded for throttling. This configuration of element has been proven to provide an unusually fine atomization (relative to other comparable size elements and flow rates per element) even with very small tube diameters and long element lengths.

This invention provides for an injection device which will give an excellent degree of atomization which is inexpensive to fabricate, uncomplicated, and very durable. Adjacent elements can have opposite swirl movements directed therethrough if desired. This invention through the use of swirling liquid momentum interchange between the flow through a first set of slots and low pressure differential throttled flow through a second set of slots provides a stable highly atomized injection pattern over a wide range of flows.

BRIEF DESCRIPTION OF THE DRAWINGS

FIG. 1 is a cross-sectional schematic view showing an injector incorporating the invention with a combustion chamber located downstream of the injector and one propellant source located upstream of said injector.

FIG. 2 is a fragmentary view of the face of the injector head as seen from the nozzle end of the rocket.

FIG. 3 is an enlarged, schematic view of a spraybar-type injector head showing the location of the injector swirler tubes relative to the inlet manifolds and relative to the slots formed in the porous face plate of the injector.

FIG. 4 is an enlarged view showing one of the swirler elements.

FIG. 5 is a view taken through the line 5—5 of FIG. 4 showing the positioning of one set of slots in the swirler element.

DESCRIPTION OF THE PREFERRED EMBODIMENT

Figure 6:
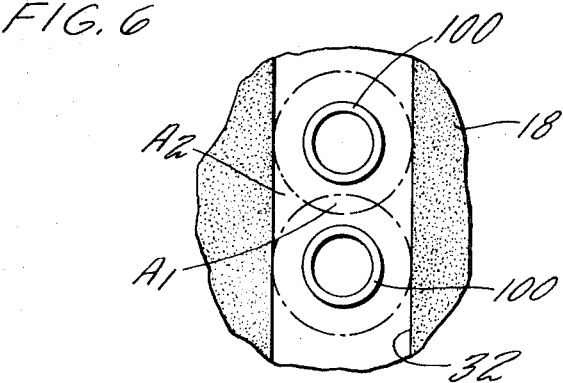
FIG. 6 is an enlarged view showing an end view of two swirler elements.

With reference to FIG. 1, a rocket 2 is shown having a combustion chamber 4 enclosed by a cylindrical wall 5 with injection means 6 forming one end of the chamber. At the other end of the combustion chamber the wall 5 is formed as a nozzle (not shown). The injection means 6 is located at the center of a main body 8. The outer portion of the main body 8 surrounding the injection means is fixed to the forward part of the rocket by bolts 10 which extend through a flange 12 positioned around the wall 5 of the rocket and which is in contact with the main body.

The part of the center of the main body 8 forming part of the injection means 6 and facing the chamber 4 is shaped as a conical portion 14 which tapers inwardly from its outer edge, which is substantially the same dimension as the inner dimension of the combustion chamber 4, to a point adjacent the center of the main body 8. A passageway 16 extends from the front of the main body 8 to the center of the conical portion 14 for a purpose to be hereinafter described.

A conically shaped plate member 18, having the same cone angle as the conical portion 14 is spaced from said conical portion 14 a predetermined distance rearwardly by a spacer member 20. Plate member 18 has face supporting rib sections 21. Spacer member 20 is fixed to the outer edge of the plate member 18. This plate member 18 can be formed of a porous material to provide for cooling of the face of the injector head. The spacer member 20 is held against the outer edge of the conical portion 14 by a flange 22 extending from a washer 24. This washer 24 is positioned in a recess 26 formed between the main body 8 and forward end of the wall 5 of the rocket. These parts are sized so that when the bolts 10 are torqued into place and the main body 8 and wall 5 are in proper mating engagement, spacer member 20 and washer 24 become fixedly positioned. Ring 22 may be separately bolted into position.

The part of the center of the main body 8 forming part of the injection means 6 can be formed as inwardly extending radial spraybars 30 with radial passageways being located between each pair of adjacent spraybars. These will serve the same purpose as the passageway 16 referred to above. The rear part of the spraybars could be slanted forwardly as they extend inwardly to produce the conical line as shown in FIG. 1.

Whether or not the center of the main body is formed with a passageway 16 or formed having spraybars 30, the plate member 18 forming the face of the injector would appear as it does in FIG. 2. As shown in FIG. 2, radial slots appear around the surface of plate member 18, long slots 32 and short slots 34, the length of the slots being different to provide for proper distribution over the circular face. In the main body 8 in line with each of the slots 32 and 34 are holes 40 extending in a line for substantially the length of the slot. Naturally, when the spraybar-type construction is used, the holes 40 extend down the rearward face of each spraybar, one of which is aligned behind each slot 32 and 34.

Around the outer periphery of the main body 8 two manifolds are located, a primary liquid manifold 50 and a secondary liquid manifold 52. The primary manifold 50 is formed by a groove 54 around the periphery of the main body 8 and a mating groove 56 which is formed in a cover member 58 which is fixed to the main body 8. The secondary manifold 52 is formed by a groove 60 around the periphery of the main body 8 and a mating groove 62 which is formed in a cover member 64 which is fixed to the main body 8. These covers 58 and 64 can be fixed by any desirable means.

In radial alignment in the main body with each of the slots in the face of the injector head and the lines of holes 40 in the center of the main body are two passageways 70 and 72. These passageways 70 and 72 are formed by being drilled from the outer periphery of main body 8 in groove 60. Passageway 70 intersects the bottom of each line of holes 40 which are aligned behind a single slot 32 or 34. Passageway 72 intersects each line of holes midway between the passageway 70 and the face of the injector head.

In each of the holes 40 a swirler element 100 is fixed to connect the passageways 70 and 72 to the face of the injector.

Each swirler element is fixed in place by brazing or any other means which will provide a seal between each element and the portions of the hole 40 which it engages. This is done to prevent leakage between passageways 72 and 70 and between passageway 72 and the rear opening of the holes 40.

Each swirler element 100 comprises a tube having two sets of slots 102 and 104 which cooperate respectively with passageways 72 and 70. Each slot of each set of slots is shown being tangentially positioned to provide a swirling effect within the element. The tangential entry forces the liquid from either primary manifold 50 or secondary manifold 52 to swirl inside the cylindrical swirler element 100 and provide a self-atomized, hollow spray cone. In the construction shown, there are three slots in each set. The rearward end of each swirler element is positioned approximately at the face of the surface 14. One exception is the elements adjacent the wall 5 of the combustion chamber where the outer sides are lengthened so as to control burning adjacent the face of the wall.

Since the slots 104 are used to inject the liquid from the secondary manifold 52, the passageways 70 serve this purpose as drilled; however, since the slots 102 are used to inject the liquid from the primary manifold 50 a connecting passageway 74 is drilled from groove 54 to each passageway 72 and a plug 88 is placed at the end of each passageway 72 between the intersection of passageway 74 and the groove 60. It can be seen that a liquid entering the manifold 50 will pass through passageways 74 and 72 and into slots 102 t be discharged from the free end of element 100. A liquid entering the manifold 52 will pass through passageways 70 and enter slots 104 to be discharged from the free end of element 100. To provide for a maximum desired flow to the secondary slots 104, two additional passageways 96 and 98 are placed in radial alignment in front of the two passageways 70 and 72. Holes 110 connect each passageway 96 to its adjacent passageway 70 and holes 112 connect each passageway 98 to its adjacent passageway 96. Adjustment of holes 110 can be used to control the distribution of propellant across the face of the injector. Passageways 96 and 98 intersect groove 60 in the same manner as passageway 70. It can be seen, therefore, that passageways 96 and 98 are fed from the secondary manifold 52 in the same manner as passageway 70.

A primary liquid propellant supply 82 is shown connected to an inlet 90 of manifold 50 by conduit means having a control valve 86 and a secondary liquid propellant supply 80 is shown connected to an inlet 92 of manifold 52 by conduit means having a control valve 84. While the supply arrangement has been shown, a single liquid supply can be used with a divider valve to control the flow between the primary and secondary manifolds.

Figure 8:
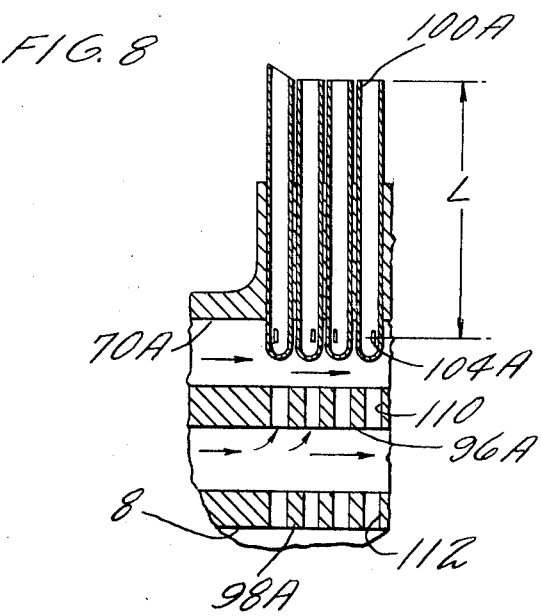
FIG. 8 is a modification of the invention showing elements having one set of slots.

When only one liquid manifold is used and deep throttling is not desired, a swirler element can be used having one set of slots. An arrangement of this type is shown in FIG. 8. The tube elements 100A have a single set of tangential openings 104A. Passageways 70A and 96A lead to said openings 104A. Passageway 110 interconnect these passageways and passageways 112 interconnect passageways 96A and 98A.

The passageway 16 formed in the main body 8 as shown in FIG. 1, or the radial passageways located between the spraybars 30 as shown in FIG. 3, have a gas directed thereto to be admitted to the openings 32 and 34 in the plate member 18. The gas is directed to the space between the conical portion 14 and plate member 18 of the injection means by a conduit means 120 from a chamber 122 formed with the forward part of the injection means. The conduit means 120 is fixed to the forward part of the main body 8 by a flange 124 which is fixed thereto by bolts 126. The spacing between elements 100 and between the main body 8 and face plate 18 was selected to provide gas injection completely surrounding each element and to create a uniform mixture ratio profile along the lines of elements 100.

The spacing of the tube elements 100 can be constructed such as shown in FIG. 6 to provide a uniform injected propellant mixture ratio along a row of elements where the elements are round and placed in a long slot. In this arrangement, the area $A_1$ is made equal to two times the area $A_2$. These areas are determined by placing a circle around each of the adjacent elements 100, using the center of the element as the center of the circle, the diameter of the circle being equal to the width of the slot in which the element is located. When this is done, it can be seen from FIG. 6 that an area $A_1$ is formed by the overlapping of adjacent circles, and two areas $A_2$ are formed between the edge of the slot and the outer edge of the two circles.

Figure 7:
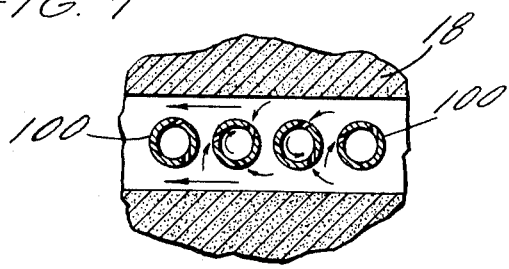
FIG. 7 is an end view of four swirler elements showing alternate elements having opposite swirl movement.

As stated hereinbefore, the swirl of the liquid injected through the tube of an element 100 is created by injecting the liquid into the tube through tangential slots. Primary and secondary slots are used to allow throttling. The primary slots are located closest to the tube exit so that the swirl velocity of the primary liquid has minimum tube wall friction dissipation prior to being injected into a chamber downstream of the open end of the element 100. The primary slots are sized to give acceptable atomization at low throttle. When the secondary liquid supply is throttled there is a momentum interchange between the secondary flow and the higher velocity primary flow, this provides a suitable liquid injection velocity for good performance. The swirling of the liquids injected through the tube also provides for regenerative cooling of the tube and dissipation of the heat input from the end exposed to the combustion chamber. In the arrangement of elements the direction of swirl can be different in different elements, that is some can be made so that the slots impart a clockwise swirl while others can be made to impart a counterclockwise swirl. In one injection assembly tested the elements were installed so that in a line, adjacent elements had opposite swirls (see FIG. 7). The counter rotation of the spray cones enhances mixing by producing a more uniform atomization pattern along a line of elements.

In an element having one set of slots of a width W, and a tube having a diameter D, it was found that the ratio of W/D should be less than 0.25 for the best results. Swirler elements have been tested having tube diameters as small as 0.075 inches and with L/D ratios as high as from 7 to 25 with satisfactory results. An element having the slot area equal to one-half of the tube area gave excellent results.

If temperatures within the combustion chamber 4 are such that the plate member 18 and spacer member 20 will experience varying degrees of growth, the flange 22 can be made to extend inwardly further and cover the outer circumference of the plate member 18. Spacing of the parts can then be made such that thermal growth of the plate would be permitted without interfering with any movement of the spacer member 20. The plate member 18 can be fixed against rotation by any means desired, such as a pin and slot, so that the plate slots 32 and 34 and aligned elements therein will maintain a proper relationship during thermal growth of the parts. I claim:

1. Injection means for injecting two propellants into a combustion chamber, one propellant being a liquid, the other propellant being a gas, a tube element for atomizing the liquid propellant, said tube element having a constant inner diameter, said tube element having an open end and a closed end, said tube element having an opening therein along its length, said opening being located adjacent the closed end of the tube element, said opening being located at an angle to the radius of the tube element to provide a swirling effect, the open end of said swirler tube element opening into said combustion chamber, means for directing a liquid propellant flow to said opening of the tube element for injection into said combustion chamber, and means for directing a gas propellant flow into said combustion chamber to mix with said atomized liquid propellant injected through said tube element, said tube element having an L/D ratio in the range of 7—25.

2. An injector assembly for injecting two propellants into a combustion chamber, one propellant being a liquid, the other propellant being a gas, said injector assembly having a body on which there are located a plurality of holes, a tube element being positioned in each hole, said tube element having an open end and a closed end, each of said tube elements having a first opening therein along its length, said first opening being located adjacent the closed end of the tube element, said first opening being located at an angle to the radius of the tube element to provide a swirling effect, a face plate spaced from said body, said face plate having second openings therein, said tube elements extending into said second openings, said second openings being spaced from said tube elements to permit a flow of gas therearound, means for directing a liquid propellant flow to said first opening of the tube elements, means for directing a gas propellant flow between said body and said face plate so that it can pass around said tube elements in said second openings.

3. A combination as set forth in claim 2 wherein said second opening is a slot and each slot contains at least two tube elements.

4. A combination as set forth in claim 3 wherein adjacent tube elements have their first openings directed in opposite directions to provide a clockwise swirling motion in one element and a counterclockwise swirling motion in the other.

5. A combination as set forth in claim 2 wherein the tube elements are of constant diameter.

6. A combination as set forth in claim 2 wherein the first opening along the length of a tube element has an area less than the area of the open end of the tube element.

7. A combination as set forth in claim 2 wherein the width of the first opening along the length of a tube element is less than one-quarter of the diameter of the tube element.

8. A combination as set forth in claim 2 wherein the tube elements have an L/D ratio in the range of 7 to 25.

9. A combination as set forth in claim 2 wherein said body includes radially disposed spray bars with each spray bar having a plurality of holes located along its length, and said means for directing a gas propellant flow directs said flow between said spray bars to a position between said body and said face plate.

10. An injector assembly for injecting two propellants into a combustion chamber, one propellant being a liquid, the other propellant being a gas, said injector assembly having a body on which there are located a plurality of holes, a tube element being positioned in each hole, said tube element having an open end and a closed end, each of said tube elements having two openings therein along its length, one of said openings being located adjacent the closed end of the tube element, said one opening being located at an angle to the radius of the tube element to provide a swirling effect, the second of said openings being located between said one opening and the open end of the tube element, said second opening being located at an angle to the radius of the tube element to provide a swirling effect, a face plate spaced from said body, said face plate having third openings therein, said tube elements extending into said third openings, said third openings being spaced from said tube elements to permit a flow of gas therearound, means for directing a primary liquid flow to said second opening of the tube elements, means for directing a secondary liquid flow to said one opening of the tube elements, and means for directing a gas flow between said body and said face plate so that it can pass around said tube elements in said third openings.

11. A combination as set forth in claim 10 wherein said second opening is a slot and each slot contains at least two tube elements.

12. A combination as set forth in claim 11 wherein adjacent tube elements have their first openings directed in opposite directions to provide a clockwise swirling motion in one element and a counterclockwise swirling motion in the other.

13. A combination as set forth in claim 10 wherein the first opening along the length of a tube element has an area less than the area of the open end of the tube element.

14. A combination as set forth in claim 10 wherein the width of the first opening along the length of a tube element is less than one-quarter of the diameter of the tube element.

15. A combination as set forth in claim 10 wherein the tube elements are of constant diameter.

16. A combination as set forth in claim 10 wherein the tube elements have an L/D ratio in the range of 7 to 25.

17. A combination as set forth in claim 10 wherein the adjacent tube elements are spaced apart and from their cooperating third opening by the relationship $A_1 = 2A_2$ where $A_1$ and $A_2$ are the areas as shown in FIG. 6.

18. An injector assembly for injecting two propellants into a combustion chamber, one propellant being a liquid, the other propellant being a gas, said injector assembly having a body, said body having radially disposed spray bars, each spray bar having a plurality of holes located along its length, a tube element being positioned in each hole, said tube having an open end and a closed end, each of said tube elements having two openings therein along its length, one of said openings being located adjacent the closed end of the tube element, said one opening being located at an angle to the radius of the tube element to provide a swirling effect, the second of said openings being located between said one opening and the open end of the tube element, said second opening being located at an angle to the radius of the tube element to provide a swirling effect, a face plate spaced from said body, said face plate having third openings therein, said tube elements extending into said third openings, said third openings being spaced from said tube elements to permit a flow of gas therearound, means for directing a primary liquid flow through said spray bars to said second opening of the tube elements, means for directing a secondary liquid flow through said spray bars to said one opening of the tube elements, and means for directing a gas flow between said spray bars to said face plate so that it can pass around said tube elements in said third openings.